Figure 1:
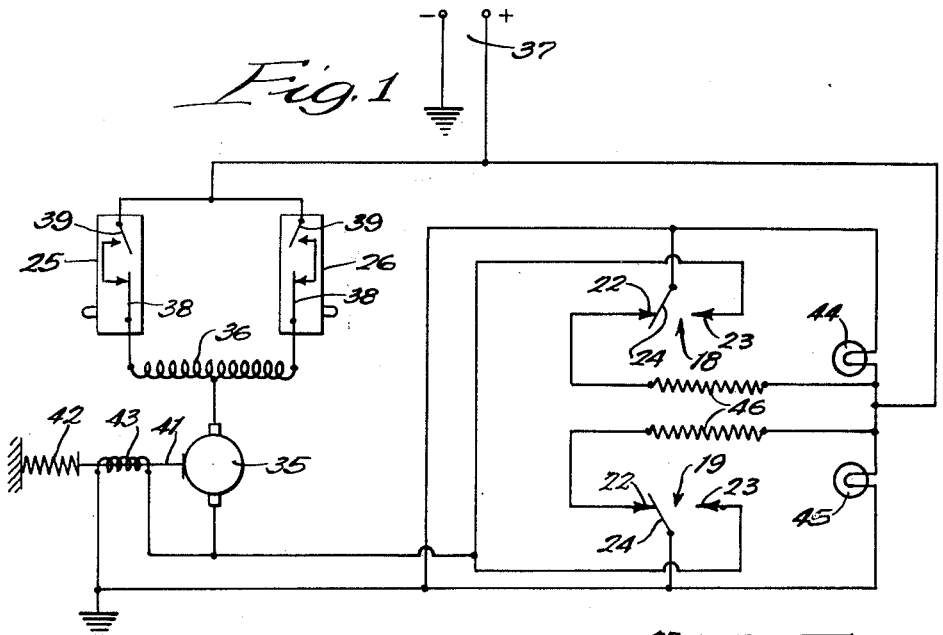

June 17, 1952  B. S. NELSON  2,600,568

MOTOR CONTROL CIRCUITS

Filed July 8, 1950

INVENTOR.
Bertel S. Nelson,
BY Dawson, Orms, Borth and Spangenberg,
ATTORNEYS.

Patented June 17, 1952

2,600,568

UNITED STATES PATENT OFFICE 2,600,568

MOTOR CONTROL CIRCUITS

Bertel S. Nelson, Chicago, Ill., assignor to Foote Bros. Gear and Machine Corporation, Chicago, Ill., a corporation of Delaware Application July 8, 1950, Serial No. 172,696

9 Claims. (Cl. 318—475)

This invention relates to motor control circuits and more particularly to the control of motor driven actuators.

Motor driven actuators, such as traveling screw devices, are widely used for moving various kinds of parts. In uses such as the movement of flaps on aircraft, the actuator is required to move the flap to a desired position and hold it under load. In other types of uses such as closing a door against a positive stop or a seal it is desirable to hold the door closed under load. For such purposes it has been customary to employ a brake acting either on the motor or the traveling screw device itself, which is released when the motor is energized, and which engages when the motor is de-energized.

It has been found, however, that with brakes of this type there is a very brief interval between interruption of the motor circuit and full engagement of the brake. During this interval the parts may tend to move or spring back due to their natural resilience, or to the load applied thereto.

With flaps or like parts under load the interval may be sufficient to cause the load to move the actuator back to the point where the limit switch is disengaged. The effect of this condition is a rapid cycling between the on and off conditions until the power supply is interrupted.

With devices such as doors moving against a positive stop the parts may spring back from the stop. This results in a loose closure and the possibility of leakage around the door.

It is one of the objects of the present invention to provide a motor control circuit in which the parts will be braked while under full load and will be held under load at their limits of movement.

Another object is to provide a motor control circuit in which a motor brake is held disengaged by a solenoid which is de-energized to cause engagement to the brake prior to interruption of the motor circuit.

According to one feature, the motor circuit is controlled in response to the load on the motor, and the solenoid is controlled by a position limit switch which is operated prior to engagement of the mechanism with its mechanical stop.

According to another feature, the solenoid is connected in series with the motor and is shunted by its limit switch to increase the motor torque after the brake is engaged.

A further object is to provide a load responsive limit switch actuated by longitudinal shifting of the worm in a worm gear set in which a single spring resists shifting of the worm in either direction.

The above and other objects and advantages of the invention will be more readily apparent from the following description when read in connection with the accompanying drawing, in which—

Figure 2:
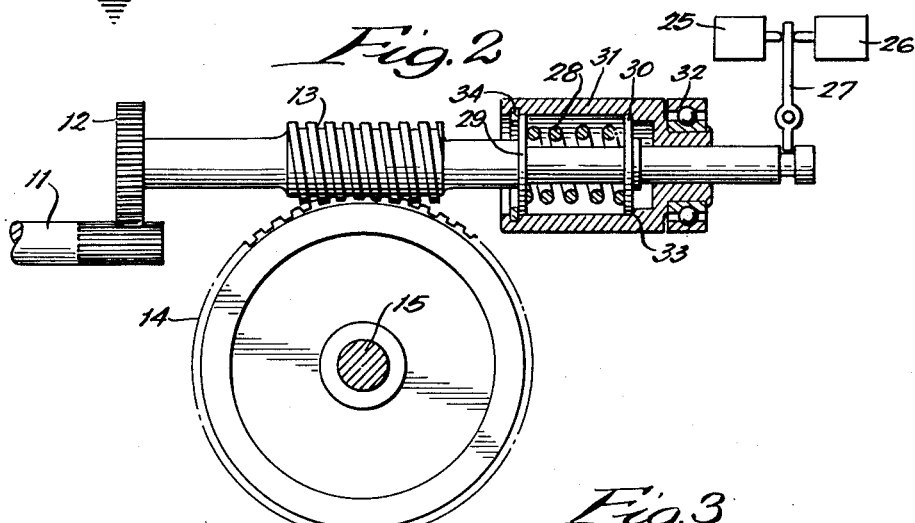

Figure 1 is a circuit diagram of a motor control apparatus embodying the invention. Figure 2 is a partial diagrammatic section showing the torque responsive limit switch control; and Figure 3 is a side elevation of a traveling screw device to which the invention is applied.

Figure 3:
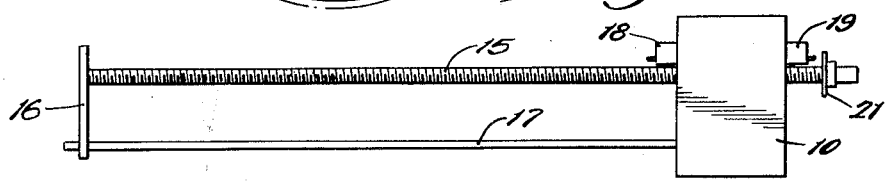

As shown in Figure 3, the present invention is utilized to control a traveling screw device, including a worm gear set, indicated generally at 10. As seen in Figure 2, the worm gear set includes a motor driven pinion 11 meshing with a pinion 12 on the shaft of a driving worm 13. The worm 13 meshes with a gear 14, which is provided with a central threaded opening to receive a screw 15, which is shifted longitudinally as the gear 14 is turned.

The screw 15 extends through the worm gear set as seen in Figure 3, and carries at one end a plate 16, which is formed with a notch or opening therein to fit slideably over a fixed guide rod 17 to prevent the screw 15 from turning. The plate 16 may be connected to a retractable landing gear mechanism, to a door, or to any other part which it is desired to operate.

The limits of movement of the screw 15 are determined by position limit switches 18 and 19 carried by the gear set 10. The switch 18 is positioned to be engaged by the plate 16 when the screw reaches its desired limit of travel to the right. A collar 21 is mounted on the screw at its right end to engage the limit switch 19 when the screw reaches its desired limit of travel to the left. As shown in Figure 1, each of the limit switches is a single pole, double throw switch, having fixed contacts 22 and 23, and a movable contact 24. The movable contacts normally occupy the positions shown in engagement with the fixed contacts 22, and are shifted into engagement with the contacts 23 when the switches are engaged and operated.

Load responsive limit switches 25 and 26 are provided for controlling the motor as hereinafter described. As shown in Figure 2, the switches 25 and 26 are operated by longitudinal shifting of the worm through a lever 27, which engages a notch in the worm shaft to be rocked thereby when the worm shifts. The worm is normally held against shifting in either direction by a single spring 28 held under compression by the collars 29 and 30 on the worm shaft, and held against separation by shoulders or stop rings on the worm shaft. It will be understood that the collars are free to slide inward toward each other and are held separated by the spring 28.

The sleeve 31 fits around the worm shaft and is rotatably supported and held against axial movement by a bearing 32. The sleeve is formed with an internal shoulder 33 bearing against the outer face of the collar 30, and carries at its free end a stop ring 34 bearing against the outer face of the collar 29. With this construction, when there is no longitudinal load on the worm, the spring 28 will hold the worm in the desired normal axial position. If there is a load on the worm urging it to the right, the worm will tend to shift to the right, compressing the spring 28 between the collar 29, which is held against movement by the worm, and the collar 30, which is held against movement by the shoulder 33. Similarly, if the worm tends to shift to the left, the spring 28 will be compressed between the collar 29, which is held against movement by the ring 34, and the collar 30, which moves to the left with the worm. Thus, a single spring serves to center the worm and to resist shifting thereof in either direction. By properly selecting and calibrating the spring 28, the load in either direction under which the worm will shift can be selected as desired.

Referring now to Figure 1, the driving motor for the worm gear unit is indicated at 35 as being a series wound motor having a center tapped field winding 36. The opposite ends of the field winding 36 are connected to one side of a source of supply 37 through the switches 25 and 26. As shown, each of these switches includes a normally closed contact 38, which is opened by shifting of the lever 27, and a manually controlled contact 39, which may be closed manually to select the desired direction of movement.

The motor is adapted to be held against rotation by a brake 41 urged into engagement by a spring 42 to hold the motor and the connected actuator parts against movement. The brake is disengaged by a solenoid 43, one side of which is connected in series with the motor, and the other side of which is connected to the other side of the source through ground, as shown. The first mentioned side of the solenoid and the motor are connected to the contacts 23 of the switches 18 and 19, as shown. The switch blades 24 of these switches are connected to ground and are also connected through signal lights 44 and 45 to the first side of the source. Resisters 46 are connected between the first side of the source and the switch contacts 22, as shown.

As illustrated in Figure 1, the circuit is in its inactive position with the switches 39 both open. At this time the signal lights 44 will be energized with the resisters 46 in parallel therewith so that both signal lights will burn dimly indicating that the system is in a neutral position. To move the screw 15 in one direction or the other, the desired one of the manual switches 39 may be closed. Assuming the manual switch in the limit switch 25 is closed, the left half of the motor field winding 36 will be energized to run the motor in one direction. Since the switch contacts 23 are open, the motor current will flow in series through the solenoid 43 to disengage the brake so that the motor can turn freely. This operation will continue until one of the limit switches, say, limit switch 18, is engaged by the plate 16 to move its contact 24 into engagement with its contact 23. This completes a circuit in shunt with the solenoid 43 so that the brake is released and engages the motor. At the same time, the resistance 46 in parallel with lamp 44 is cut out of the circuit so that the lamp 44 will burn brightly, indicating that the mechanism has reached the limit of its travel.

Since the solenoid 43 is removed from the motor circuit, there is now less resistance in the motor circuit, so that the motor current will tend to increase. This provides adequate power to turn the motor in spite of engagement of the brake 41, and insures that the mechanism will be brought to its full limit under load. Preferably, the position limit switches 18 and 19 are adjusted to be operated when the mechanism is a short distance, approximately .005 inch, from its final limit of movement.

As the motor continues to turn the load thereon will increase due to brake drag above or to brake drag plus the load produced by engagement of the mechanism with a mechanical stop. When the load on the motor increases to the point where the worm will be shifted to open the contact 38 of the limit switch 25, the motor will be de-energized, but since the brake is already engaged the motor will be firmly held in its existing position or limiting stop under full load. Thus, the mechanism will be positively locked with no chance of any slack or back lash developing therein.

With the mechanism at one limit of its travel it can only move in the opposite direction since the torque limit switch 38 will remain open and the position limit switch 24 will remain operative. The operator can, however, shift the mechanism to its other limit of travel by closing the manual contact 39 of the switch 26. In this operation the same sequence will be followed in the same manner but in the opposite direction to operate the opposite limit switches.

While one embodiment of the invention has been shown and described in detail, it will be understood that this is illustrative only and is not to be taken as a definition of the scope of the invention, reference being had for this purpose to the appended claims.

What is claimed is:

1. A motor control circuit comprising a motor, a friction brake to hold the motor against rotation, a solenoid controlling the brake, a limit switch operated by movement of the motor to a predetermined position to control the solenoid to cause engagement of the brake, and a second limit switch operated after the brake is engaged to de-energize the motor.

2. A motor control circuit comprising a motor, a friction brake to hold the motor against rotation, a solenoid controlling the brake, a limit switch operated by movement of the motor to a predetermined position to control the solenoid to cause engagement of the brake, a second limit switch to control the motor, and means responsive to the load on the motor to operate the second limit switch to de-energize the motor in response to a predetermined load.

3. A motor control circuit comprising a motor, a friction brake to hold the motor against rotation, means normally urging the brake into engagement, a solenoid to hold the brake disengaged when the solenoid is energized, the solenoid being connected in series with the motor, a normally open limit switch closed by movement of the motor to a predetermined position connected in shunt with the solenoid, a normally closed limit switch in circuit with the motor, and means to open the last named switch after the first named switch has closed.

4. A motor control circuit comprising a motor, a friction brake to hold the motor against rotation, means normally urging the brake into engagement, a solenoid to hold the brake disengaged when the solenoid is energized, the solenoid being connected in series with the motor, a normally open limit switch closed by movement of the motor to a predetermined position connected in shunt with the solenoid, a normally closed limit switch in circuit with the motor, and means responsive to the load on the motor to open the last named switch.

5. The construction of claim 4 in which the motor is series wound.

6. In combination with a traveling screw device, and a motor for driving the screw of a motor control circuit comprising a brake to hold the motor and screw device against rotation, a solenoid to disengage the brake, a limit switch to control the solenoid engaged by the screw device in a predetermined position thereof to cause the brake to engage, and a second limit switch operable after engagement of the brake to de-energize the motor.

7. In combination with a traveling screw device, and a motor for driving the screw of a motor control circuit comprising a brake to hold the motor and screw device against rotation, a solenoid to disengage the brake, a limit switch to control the solenoid engaged by the screw device in a predetermined position thereof to cause the brake to engage, a second limit switch to control the motor, and means responsive to the load on the motor to operate the second limit switch to de-energize the motor.

8. In combination with a traveling screw device, a worm gear unit to drive the screw device, means mounting the worm of said unit for longitudinal shifting movement, resilient means to limit shifting of the worm, and a brake to hold the motor and worm device against movement, of a control circuit comprising a solenoid to disengage the brake, a limit switch to control the solenoid engaged by the screw device in a predetermined position thereof to cause the brake to engage, and a second limit switch operated by longitudinal shifting of the worm to de-energize the motor.

9. In combination with a motor, a worm gear unit including a longitudinally shiftable worm driven by the motor, a pair of discs shiftable on the worm, stops on the worm to hold the discs against longitudinal separation, fixed stop means engaging the outer surfaces of the discs, a compression spring between the discs, a brake to hold the motor against rotation, a first limit switch operated by movement of the motor to a predetermined position to cause engagement of the brake, and a second limit switch operated by longitudinal shifting of the worm to de-energize the motor.

BERTEL S. NELSON.

REFERENCES CITED

The following references are of record in the file of this patent:

UNITED STATES PATENTS

| Number | Name | Date |
| --- | --- | --- |
| 833,125 | Cowles | Oct. 9, 1906 |
| 2,007,658 | Parrish | July 9, 1935 |
| 2,452,178 | Brownlee | Oct. 26, 1948 |
| 2,484,616 | Dulaney | Oct. 11, 1949 |